(12) United States Patent
Umemoto et al.

(10) Patent No.: US 8,943,800 B2
(45) Date of Patent: Feb. 3, 2015

(54) AIR-FUEL RATIO CONTROL APPARATUS

(71) Applicant: NGK Spark Plug Co., Ltd., Nagoya-shi, Aichi (JP)

(72) Inventors: Kenichiro Umemoto, Inuyama (JP); Shuichi Hanai, Nagoya (JP); Koji Nagura, Kasugai (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 14/149,178

(22) Filed: Jan. 7, 2014

(65) Prior Publication Data

US 2014/0190149 A1 Jul. 10, 2014

(30) Foreign Application Priority Data

Jan. 9, 2013 (JP) ................. 2013-002043

(51) Int. Cl.
*F01N 3/00* (2006.01)
*F01N 3/20* (2006.01)
*F01N 11/00* (2006.01)

(52) U.S. Cl.
CPC ............... *F01N 3/20* (2013.01); *F01N 11/007* (2013.01); *F01N 2550/02* (2013.01); *F01N 2560/025* (2013.01); *F01N 2560/14* (2013.01); *F01N 2560/20* (2013.01)
USPC ............... 60/276; 60/277; 60/284; 60/285; 60/286; 73/114.71; 73/114.72; 73/114.73

(58) Field of Classification Search
CPC .......... F01N 2560/20; F01N 2560/025; F01N 2250/22; F01N 9/005; F01N 11/002; F01N 11/007; F01N 2900/0416; F01N 2900/0418; F01N 2900/0602; F01N 2900/1404; F01N 2900/1602; F02D 41/1494; F02D 41/1495; F02D 14/222

USPC ........... 60/274, 275, 276, 277, 285, 286, 300; 73/114.71, 114.72, 114.73, 114.75
See application file for complete search history.

(56) References Cited

U.S. PATENT DOCUMENTS

| | | | | |
|---|---|---|---|---|
| 6,164,125 | A * | 12/2000 | Kawase et al. | 73/114.73 |
| 6,898,927 | B2 * | 5/2005 | Morinaga et al. | 60/284 |
| 7,047,728 | B2 * | 5/2006 | Yasui | 60/285 |
| 7,114,325 | B2 * | 10/2006 | Surnilla et al. | 60/276 |
| 7,805,928 | B2 * | 10/2010 | Shouda et al. | 60/285 |
| 8,646,252 | B2 * | 2/2014 | Gibson et al. | 60/274 |

FOREIGN PATENT DOCUMENTS

JP 2009-79546 A 4/2009

\* cited by examiner

*Primary Examiner* — Binh Q Tran
(74) *Attorney, Agent, or Firm* — Sughrue Mion, PLLC

(57) ABSTRACT

When an internal combustion engine (1) is determined to be in a low-temperature start state (an affirmative determination is made in S120), an air-fuel ratio control apparatus (10) controls the temperature of a downstream detection element (17) of a downstream gas sensor (15) to a downstream target temperature by driving a downstream heater (16) of the downstream gas sensor (15) (S170), and feedback-controls the air-fuel ratio of exhaust gas based on the output of the downstream gas sensor (15) (S190). When the engine (1) is determined not to be in the low-temperature start state (a negative determination is made in S120), the air-fuel ratio control apparatus (10) drives an upstream heater (25) of an upstream gas sensor (22) and feedback-controls the air-fuel ratio of exhaust gas based on the output of the upstream gas sensor (22) (S270).

3 Claims, 8 Drawing Sheets

AIR-FUEL RATIO CONTROL APPARATUS

BACKGROUND OF THE INVENTION

1. Field of the Invention

The present invention relates to an air-fuel ratio control apparatus for an internal combustion engine.

2. Description of the Related Art

Conventionally, an air-fuel ratio control apparatus has been known which performs air-fuel ratio feedback control using a sensor output from a gas sensor provided in an exhaust passage of an internal combustion engine.

This air-fuel ratio control apparatus detects the concentration of a specific gas (e.g., oxygen) contained in exhaust gas using a gas sensor, and performs feedback control of the air-fuel ratio on the basis of the detected concentration.

Immediately after having been started at a low temperature, an internal combustion engine may enter a start state in which condensed water is present in the exhaust passage (hereinafter also referred to as a "low-temperature start state"). In the case where a gas sensor with a heater is used in an internal combustion engine in such a low-temperature start state, condensed water may adhere to a hot sensor element heated by the heater. In such a case, the sensor element may break due to thermal shock.

An air-fuel ratio control apparatus which overcomes such a drawback has been proposed (Patent Document 1). When an internal combustion engine is in a low-temperature start state, the proposed air-fuel ratio control apparatus first performs feedback control using a sensor output from a gas sensor provided downstream of a catalyst. When the engine enters an ordinary operation state in which condensed water is not present in the exhaust passage, the apparatus switches to feedback control using a sensor output from a gas sensor provided upstream of the catalyst.

Notably, in such a low-temperature start state, a time which has elapsed before condensed water from the engine (exhaust port) discharges is longer than a time which has elapsed before the condensed water accumulated in the exhaust pipe evaporates. Also, the condensed water discharged from the engine is dispersed (scattered) when passing through the catalyst. Therefore, as compared with the upstream gas sensor, the downstream gas sensor is less likely to suffer adhesion of condensed water discharged from the engine (hereinafter referred to as "water adhesion").

Namely, the heater of the gas sensor located on the downstream side of the catalyst can be activated earlier than the heater of the gas sensor located on the upstream side of the catalyst.

Accordingly, by performing feedback control using the sensor output from the gas sensor on the downstream side of the catalyst as in the above-described conventional air-fuel ratio control apparatus, the time between startup of the internal combustion engine and the time at which the feedback control is started can be shortened as compared with the case where the feedback control is performed using only the sensor output from the gas sensor on the upstream side of the catalyst.

[Patent Document 1] Japanese Patent Application Laid-Open (kokai) No. 2009-079546

3. Problem to be Solved by the Invention

The above-described conventional air-fuel ratio control apparatus has the following problem. There is a possibility of water adhesion even on the gas sensor downstream of the catalyst during a period between the startup of the internal combustion engine and a point in time when the temperature of the exhaust system reaches a moisture evaporation temperature. Accordingly, before that point in time, the heater of the gas sensor on the downstream side of the catalyst cannot be activated, and the feedback control of the air-fuel ratio using the gas sensor on the downstream side of the catalyst cannot be performed.

Namely, in the waiting period before the temperature of the exhaust system reaches the moisture evaporation temperature, it is necessary to control the air-fuel ratio by open control in which no sensor output is used, rather than by feedback control. Thus, control of the the air-fuel ratio in accordance with the actual change state of exhaust gas cannot be carried out.

SUMMARY OF THE INVENTION

The present invention has been made so as to solve the above-described problem, and an object of the present invention is to provide an air-fuel ratio control apparatus which can perform air-fuel ratio feedback control at an early timing when an internal combustion engine is started at a low temperature.

The above object has been achieved by providing (i) an air-fuel ratio control apparatus comprising: a catalyst provided in an exhaust passage of an internal combustion engine; an upstream gas sensor which is provided in the exhaust passage to be located on the upstream side of the catalyst and which includes a detection element and an element heating heater; a downstream gas sensor which is provided in the exhaust passage to be located on the downstream side of the catalyst and which includes a detection element and an element heating heater; heater control means for controlling the heating states of the element heating heater of the upstream gas sensor and the element heating heater of the downstream gas sensor; and air-fuel ratio control means for controlling exhaust air-fuel ratio on the basis of an output from at least one of the upstream gas sensor and the downstream gas sensor. The air-fuel ratio control apparatus further comprises start state determination means for determining whether or not the internal combustion engine is in a low-temperature start state, wherein the heater control means controls the temperature of the detection element of the downstream gas sensor to a predetermined downstream target temperature using the element heating heater of the downstream gas sensor when the start state determination means determines that the engine is in the low-temperature start state, and the heater control means controls the temperature of the detection element of the upstream gas sensor to a predetermined upstream target temperature using the element heating heater of the upstream gas sensor when the start state determination means determines that the engine is not in the low-temperature start state; the air-fuel ratio control means feedback-controls the exhaust air-fuel ratio based on the output of the downstream gas sensor when the start state determination means determines that the engine is in the low-temperature start state and the detection element of the downstream gas sensor becomes active, and the air-fuel ratio control means feedback-controls the exhaust air-fuel ratio based on the output of the upstream gas sensor when the start state determination means determines that the engine is not in the low-temperature start state and the detection element of the upstream gas sensor becomes active; and the downstream target temperature is a temperature which is lower than the upstream target temperature and at which the detection element of the downstream gas sensor becomes active, and at which the detection element of the downstream gas sensor does not break due to water adhesion.

Namely, when the internal combustion engine is determined to be in the low-temperature start state, the air-fuel ratio control apparatus first controls the temperature of the detection element of the downstream gas sensor to the downstream target temperature using the element heating heater of the downstream gas sensor, and feedback-controls the exhaust air-fuel ratio based on the output of the downstream gas sensor.

In the case where the internal combustion engine is in the low-temperature start state, condensed water may exist in a region of the exhaust passage located upstream of the catalyst. However, such condensed water is dispersed (scattered) when it passes through the catalyst. Therefore, in the case where the internal combustion engine is determined by the start state determination means to be in the low-temperature start state, the possibility of breakage of the detection element of the downstream gas sensor due to adhesion of the condensed water thereto is low even when the heater control means drives the element heating heater of the downstream gas sensor.

At that time, the heater control means controls the heater such that the temperature of the detection element of the downstream gas sensor approaches the downstream target temperature. The downstream target temperature is a temperature at which the detection element of the downstream gas sensor does not break due to water adhesion. Therefore, even when condensed water adheres to the detection element of the downstream gas sensor, the detection element does not break due to water adhesion.

Since the downstream gas sensor is activated as a result of the temperature of the detection element of the downstream gas sensor being controlled to the downstream target temperature by the heater control means, the air-fuel ratio control means can feedback-control the exhaust air-fuel ratio based on the output of the downstream gas sensor. Notably, in the low-temperature start state, the catalyst is not active, and absorption and release of oxygen are not performed. Therefore, the feedback control of the exhaust air-fuel ratio based on the output of the downstream gas sensor can be performed.

Namely, in the case where the internal combustion engine is in the low-temperature start state, the air-fuel ratio control apparatus of the present invention can drive the element heating heater of the downstream gas sensor and feedback-control the exhaust air-fuel ratio based on the output of the downstream gas sensor without waiting until the temperature of the exhaust system reaches the moisture evaporation temperature.

Also, in the case where the internal combustion engine is not in the low-temperature start state, the air-fuel ratio control apparatus determines that condensed water does not exist in a region of the exhaust passage on the upstream side of the catalyst. Therefore, the air-fuel ratio control apparatus can drive the element heating heater of the upstream gas sensor and feedback-control the exhaust air-fuel ratio based on the output of the upstream gas sensor without waiting until the temperature of the exhaust system reaches the moisture evaporation temperature.

Namely, the air-fuel ratio control apparatus of the present invention performs early feedback-control of the air-fuel ratio using the downstream gas sensor when the internal combustion engine is in the low-temperature start state, and performs early feedback-control of the air-fuel ratio using the upstream gas sensor when the internal combustion engine is not in the low-temperature start state.

Therefore, according to the air-fuel ratio control apparatus of the present invention, the feedback-control of the air-fuel ratio can be performed at an early timing, without waiting until the temperature of the exhaust system reaches the moisture evaporation temperature, even in the case where the internal combustion engine is in the low-temperature start state.

In a preferred embodiment (2), the air-fuel ratio control apparatus (1) above further comprises catalyst deterioration determination means for determining whether or not a change period of the output of the downstream gas sensor satisfies a predetermined catalyst deterioration condition when the exhaust air-fuel ratio is controlled by the air-fuel ratio control means based on the output of the downstream gas sensor, the catalyst deterioration determination means determining that the catalyst is in a deteriorated state when the change period satisfies the catalyst deterioration condition, and determining that the catalyst is in an undeteriorated state when the change period does not satisfy the catalyst deterioration condition.

When deterioration of the catalyst progresses with the elapse of time, the oxygen absorption performance of the catalyst changes. Namely, the oxygen absorption speed of the catalyst changes between the case where the catalyst has deteriorated and the case where the catalyst has not yet deteriorated.

In the case where the air-fuel ratio is feedback-controlled based on the output of the downstream gas sensor, the response time (the time needed for the concentration of oxygen contained in exhaust gas to change as a result of the feedback control) changes due to the influence of the degree of deterioration of the catalyst.

Therefore, the determination as to whether or not the catalyst is in the deteriorated state can be made by determining whether the change period of the output of the downstream gas sensor satisfies the predetermined catalyst deterioration condition.

Since the air-fuel ratio control apparatus of the present invention includes the catalyst deterioration determination means which determines whether or not the change period of the output of the downstream gas sensor satisfies the catalyst deterioration condition, the air-fuel ratio control apparatus can determine whether the catalyst is in the deteriorated state or the undeteriorated state. Specifically, the catalyst deterioration determination means determines that the catalyst is in the deteriorated state when the change period of the output satisfies the catalyst deterioration condition, and determines that the catalyst is in the undeteriorated state when the change period of the output does not satisfy the catalyst deterioration condition.

Therefore, according to the present invention, even in the case where the internal combustion engine is in the low-temperature start state, it is possible to perform feedback control of the air-fuel ratio at an early timing and determine the state of deterioration of the catalyst. Therefore, it becomes possible to properly control the air-fuel ratio in consideration of the state of deterioration of the catalyst.

In another preferred embodiment (3) of the air-fuel ratio control apparatus (1) or (2) above, the detection element of the upstream gas sensor is a plate-shaped oxygen detection element whose output changes linearly in accordance with the oxygen concentration of exhaust gas; and the detection element of the downstream gas sensor is an oxygen detection element which has a bottomed tubular shape and whose output changes abruptly near the theoretical air-fuel ratio.

First, the oxygen detection element having a bottomed tubular shape resists breakage due to water adhesion to a greater degree, as compared with a plate-shaped oxygen detection element. In the case where the oxygen detection element having a bottomed tubular shape is used as the detection element of the downstream gas sensor, even in the low-temperature start state, the detection element of the downstream gas sensor is less likely to break due to water adhesion, and feedback control of the air-fuel ratio based on the output of the downstream gas sensor can be properly continued.

The plate-shaped oxygen detection element whose output changes linearly in accordance with the oxygen concentration of exhaust gas is susceptible to breakage due to water adhesion, as compared with the oxygen detection element having a bottomed tubular shape. However, since the output of the plate-shaped oxygen detection element changes linearly in accordance with the oxygen concentration, the feedback control of the air-fuel ratio can be performed accurately. Therefore, in the case where the above-mentioned plate-shaped oxygen detection element is used as the detection element of the upstream gas sensor, the concentration of oxygen within exhaust gas can be detected more accurately when the engine is not in the low-temperature start state. Therefore, by performing feedback control of the air-fuel ratio based on the output of the upstream gas sensor, the control accuracy of the feedback control can be improved.

DESCRIPTION OF REFERENCE NUMERALS

Figure 1:
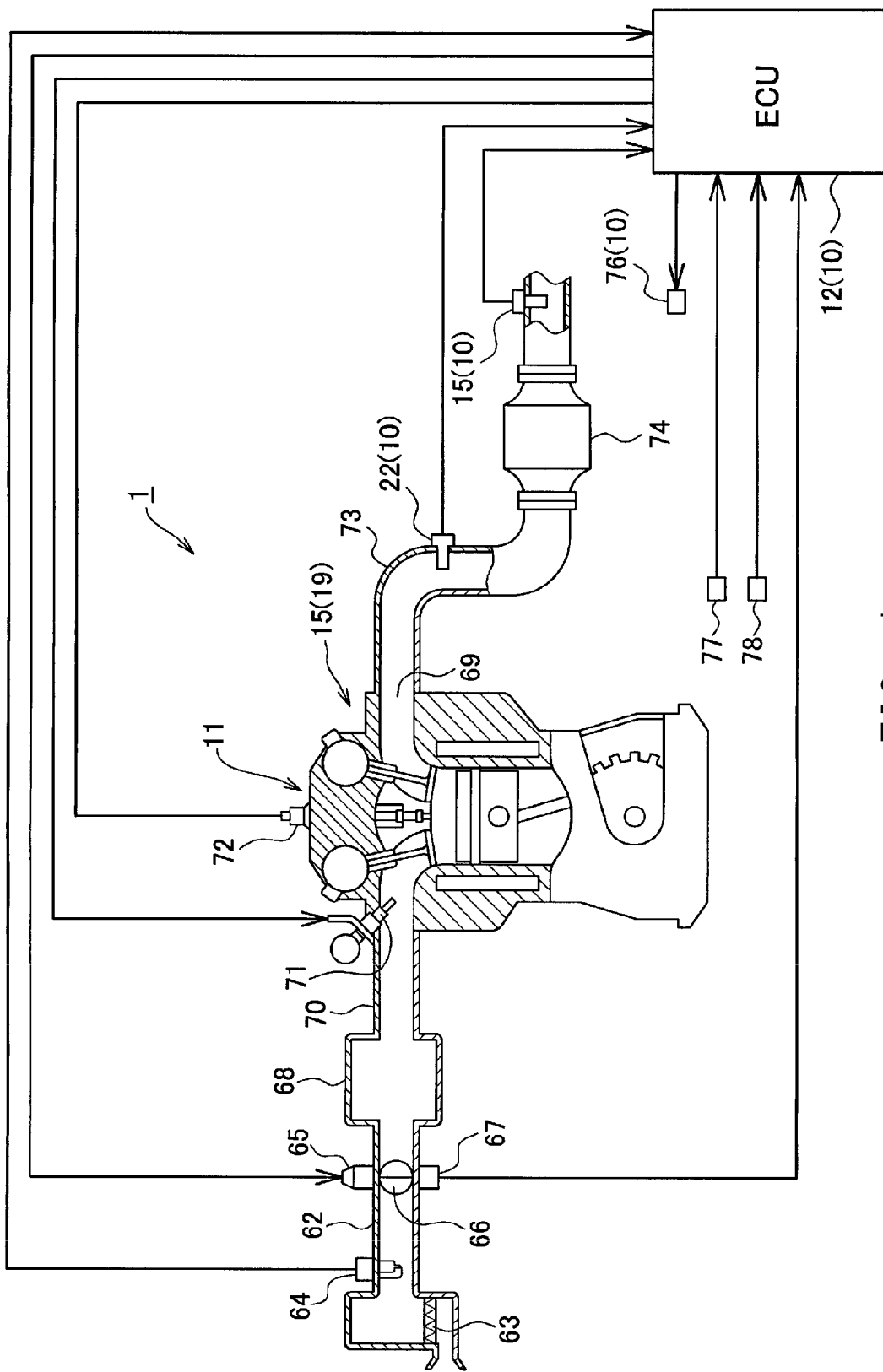
FIG. 1 is a schematic diagram of an internal combustion engine having an air-fuel ratio control apparatus.

Reference numerals used to identify various features in the drawings include the following.

1: internal combustion engine, 10: air-fuel ratio control apparatus, 12: control section, 15: downstream gas sensor, 16: ceramic heater (downstream heater), 17: downstream detection element, 22: upstream gas sensor, 23: upstream detection element, 24: element section, 25: heater section (upstream heater), 74: catalyst, 76: catalyst deterioration notification lamp.

DETAILED DESCRIPTION OF THE PREFERRED EMBODIMENTS

An embodiment to which the present invention is applied will now be described with reference to the drawings. However, the present invention should not be construed as being limited thereto.

In the embodiment shown below, an air-fuel ratio control apparatus of an internal combustion engine to which the present invention is applied will be described as an example.

[1. First Embodiment]
[1-1. Overall Structure]

The overall structure of an internal combustion engine 1 of the present embodiment will be described with reference to FIG. 1. FIG. 1 is a schematic diagram of the internal combustion engine 1 having an air-fuel ratio control apparatus 10.

As shown in FIG. 1, the internal combustion engine 1 of the present embodiment includes an air cleaner 63 which is provided at a furthest upstream portion of an intake pipe 62 of an engine main body portion 11 so as to avoid intake of foreign substances, and an air flow meter 64 which is provided on the downstream side of the air cleaner 63 so as to detect the quantity of intake air.

Also, the internal combustion engine 1 includes a throttle valve 66 which is provided on the downstream side of the air flow meter 64 and whose opening is adjusted by a motor 65, and a throttle opening sensor 76 which detects the opening of the throttle valve 66 (throttle opening).

Moreover, the internal combustion engine 1 includes a surge tank 68 which is provided on the downstream side of the throttle valve 66, and an intake manifold 70 which is provided on the downstream side of the surge tank 68 and introduces air into the engine main body portion 11.

A fuel injection valve 71 is attached to the intake manifold 70 at a position near an intake port. Ignition plugs 72 are attached to the engine head of the engine main body portion 11, and an air-fuel mixture within each cylinder is ignited by spark discharge of the corresponding ignition plug 72.

Also, the internal combustion engine 1 includes a water temperature sensor 77 which is provided in a cooling water system (not shown) so as to detect the temperature of cooling water, and a rotational speed sensor 78 which detects the rotational speed of the engine.

A catalyst 74 such as three-way catalyst for purifying exhaust gas is disposed in an exhaust pipe 73 connected to an exhaust port 69 of the engine main body portion 11.

A downstream gas sensor 15 which detects the concentration of oxygen contained in exhaust gas is attached to the exhaust pipe 73 at a location downstream of the catalyst 74, and an upstream gas sensor 22 which detects the concentration of oxygen contained in exhaust gas is attached to the exhaust pipe 73 at a location upstream of the catalyst 74. The downstream gas sensor 15 and the upstream gas sensor 22 are provided for the internal combustion engine 1 as an air-fuel ratio sensor, an oxygen sensor, or the like.

Figure 2:
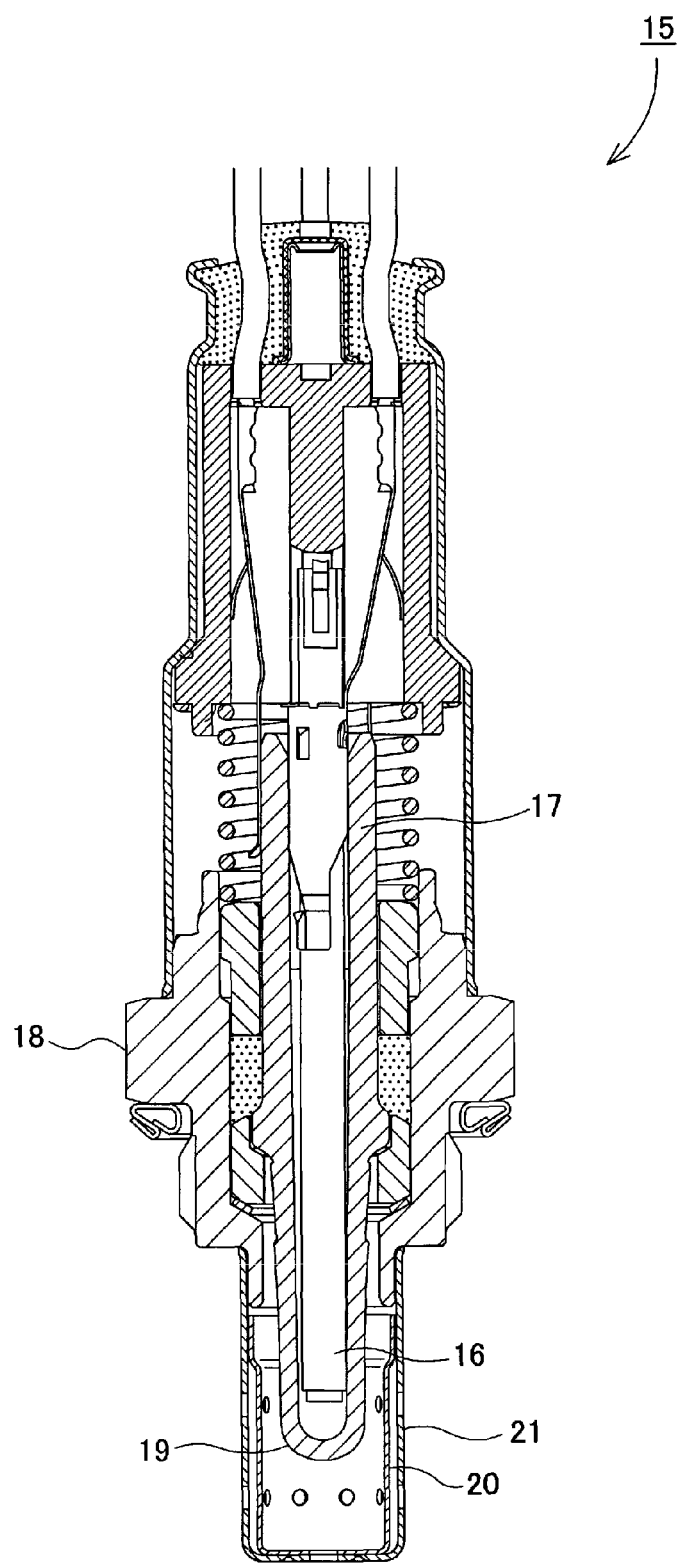
FIG. 2 is a sectional view showing the overall structure of a downstream gas sensor.

FIG. 2 is a sectional view showing the overall structure of the downstream gas sensor 15.

The downstream gas sensor 15 is mainly composed of a downstream detection element 17 which is formed of a solid electrolyte member containing zirconia ($ZrO_2$) as a main component and has the shape of a bottomed tube having a closed forward end; a rod-shaped ceramic heater 16 (hereinafter also referred to as the "downstream heater 16") disposed in the bottomed hole of the downstream detection element 17; and a casing 18 which accommodates the internal structure of the downstream gas sensor 15 and fixes the downstream gas sensor 15 to a mounting portion such as the exhaust pipe.

Protectors 20 and 21 which are formed of metal and which constitute a double-wall protector are attached to the outer periphery of a lower end portion (located on the lower side in FIG. 2) of the casing 18 by means of welding. The protectors 20 and 21 cover a projection portion (detection portion 19) of the downstream detection element 17. Each of the protectors 20 and 21 has a plurality of holes for introducing exhaust gas.

When this downstream gas sensor 15 is used, the outer surface of the detection portion 19 of the downstream detection element 17 is exposed to exhaust gas, and the inner surface of the detection portion 19 of the downstream detection element 17 is exposed to a reference gas (atmosphere) having a reference oxygen concentration. As a result, the downstream gas sensor 15 produces an electromotive force corresponding to the oxygen concentration of the exhaust gas, and this electromotive force changes abruptly near the theoretical air-fuel ratio. Therefore, the downstream gas sensor 15 functions as an oxygen sensor whose output changes abruptly near the theoretical air-fuel ratio.

Figure 3:
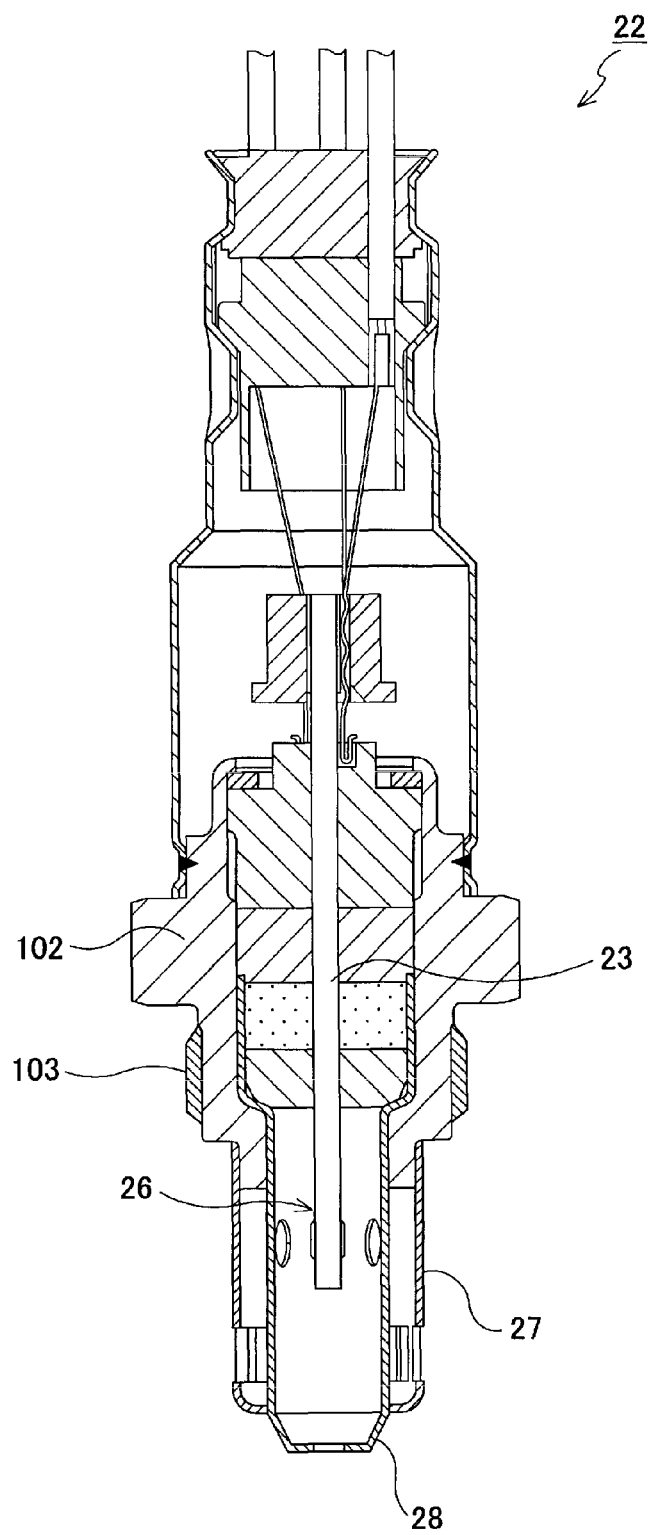
FIG. 3 is a sectional view showing the overall structure of an upstream gas sensor.

FIG. 3 is a sectional view showing the overall structure of the upstream gas sensor 22.

The upstream gas sensor 22 is mainly composed of a tubular metallic shell 102 which has a screw portion 103 formed on the outer surface thereof and used for fixing to the exhaust pipe, and a plate-shaped upstream detection element 23 extending in the axial direction (in the vertical direction in FIG. 3).

An outer protector 27 and an inner protector 28 which are formed of metal (e.g., stainless steel or the like) and which constitute a double-wall protector are attached to the outer periphery of a forward end portion (located on the lower side in FIG. 3) of the metallic shell 102 by means of welding or the like. The protectors 27 and 28 cover a projection portion (detection portion 26) of the upstream detection element 23. Each of the protectors 27 and 28 has a plurality of holes.

Figure 4:
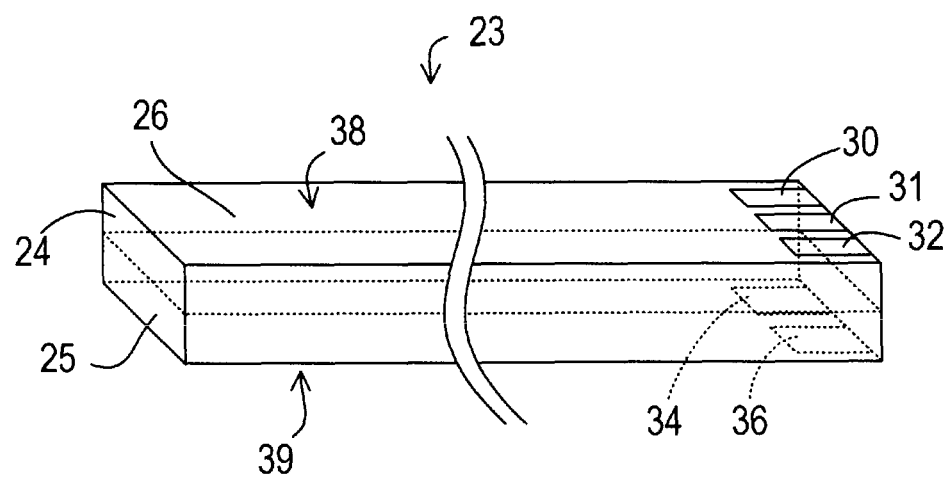
FIG. 4 is a perspective view schematically showing the structure of an upstream detection element.

FIG. 4 is a perspective view schematically showing the structure of the upstream detection element 23. In FIG. 4, an intermediate portion of the upstream detection element 23 in the axial direction is omitted.

The upstream detection element 23 is formed by stacking a plate-shaped element section 24 extending in the axial direction (the left-to-right direction in FIG. 4) and a plate-shaped heater section 25 (hereinafter also referred to as the "upstream heater 25") extending in the axial direction. Therefore, the upstream detection element 23 has a rectangular cross section. The detection portion 26, which is covered with a protection layer (not shown) is formed on a front end portion (located on the left side in FIG. 4) of the upstream detection element 23 exposed to a gas to be measured, and electrode terminals 30, 31, 32, 34 and 36 are formed on first and second faces 38 and 39 which are front-side and back-side portions of the outer surface of a rear end portion (located on the right side in FIG. 4) of the upstream detection element 23. Notably, since the upstream detection element 23, which is used as a gas sensor element for detecting the oxygen concentration of exhaust gas, has a known structure (i.e., the heater section 25 in which a heat-generation resistor is sandwiched between insulating layers is stacked on the element section 24 in which an oxygen pumping cell and an oxygen concentration detection cell are stacked via an insulating layer having a hollow measurement chamber), the detailed description of its internal structure, etc., is omitted. Notably, each of the oxygen pumping cell and the oxygen concentration detection cell is formed by providing a pair of electrodes on the front and back surfaces of a solid electrolyte layer containing zirconia as a main component.

This upstream detection element 23 operates as follows. A control circuit section provided in a control section 12 (ECU 12) controls the pump current supplied to the oxygen pumping cell such that the output of the oxygen concentration detection cell reaches a constant value. As a result, the oxygen pumping cell pumps out oxygen contained in exhaust gas introduced into the measurement chamber or pumps oxygen into the measurement chamber. Since the magnitude of the pump current flowing through the oxygen pumping cell of the upstream detection element 23 linearly changes in accordance with the oxygen concentration of exhaust gas, the upstream gas sensor 22 functions as an oxygen sensor whose output linearly changes in accordance with the oxygen concentration of exhaust gas.

Referring back to FIG. 1, the internal combustion engine 1 includes the above-mentioned control section 12 (ECU 12), which controls the operation state of the internal combustion engine based on signals which represent the states of relevant portions. The control section 12 is formed by a so-called microcomputer and has a well-known configuration, which is not shown in FIG. 1. The control section 12 includes a microprocessor which performs computation, a RAM which stores programs and data temporarily, a ROM which holds programs and data, and an A/D conversion circuit for converting analog signals to digital signals. The control section 12 also includes a control circuit section for driving and controlling the upstream detection element 23 of the upstream gas sensor 22.

Also, the internal combustion engine 1 has a catalyst deterioration notification lamp 76 for reporting that the catalyst is in a deteriorated state.

[1-2. Air-fuel Ratio Control Apparatus]

Next, the air-fuel ratio control apparatus 10 will be described which performs air-fuel ratio feedback control using the sensor outputs from the gas sensors (the downstream gas sensor 15 and the upstream gas sensor 22) provided on the exhaust pipe 73 of the internal combustion engine 1.

The air-fuel ratio control apparatus 10 is mainly composed of the control section 12 (ECU 12), the catalyst 74, the downstream gas sensor 15, and the upstream gas sensor 22.

The control section 12 executes various types of processing, such as air-fuel ratio control processing and catalyst deterioration determination processing, as control processing for controlling the operation state of the internal combustion engine based on signals representing the states of the various portions.

Figure 5:
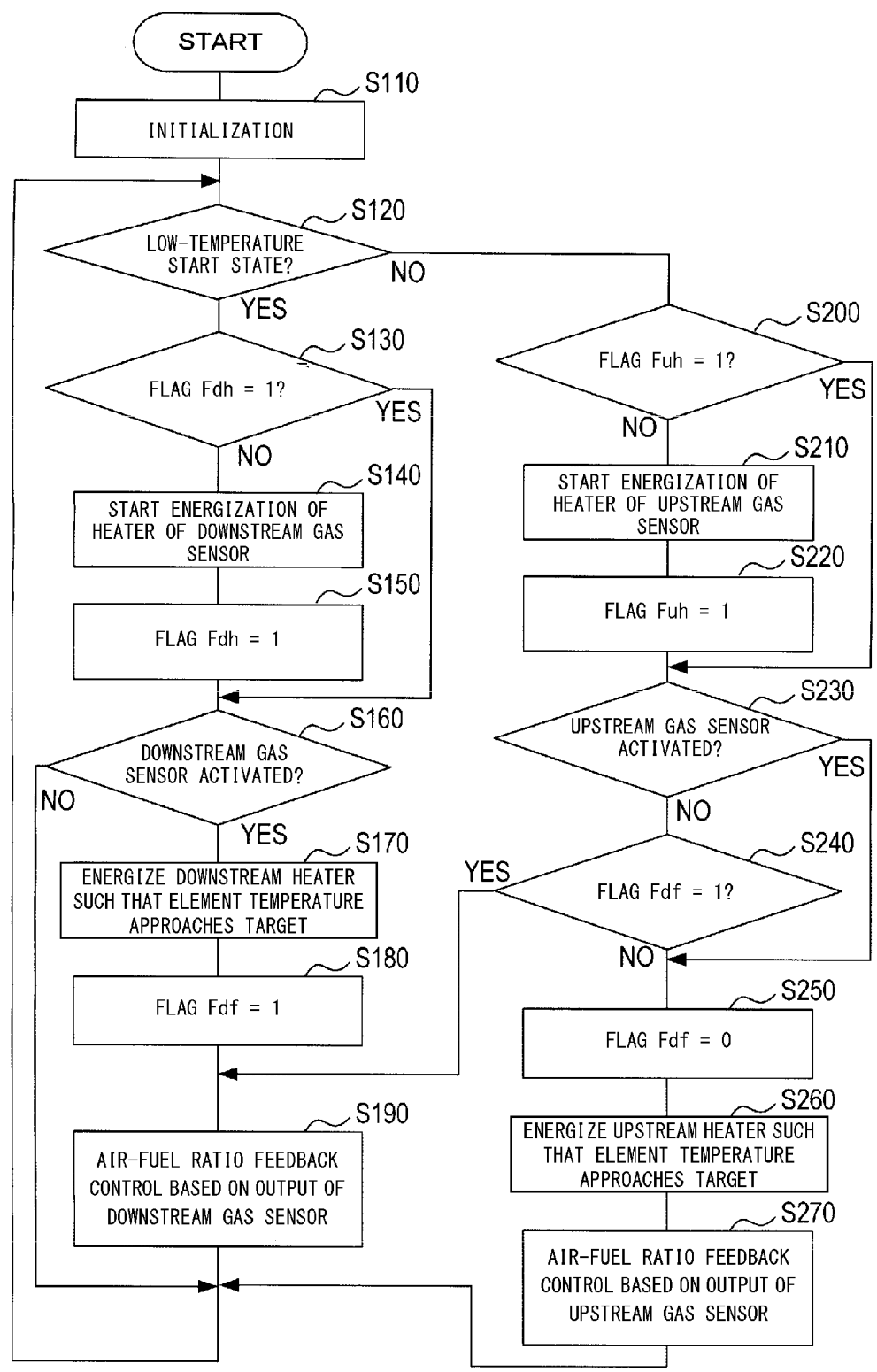
FIG. 5 is a flowchart showing the details of air-fuel ratio control processing.

The air-fuel ratio control processing executed by the control section 12 will now be described. FIG. 5 is a flowchart showing the details of the air-fuel ratio control processing.

Notably, the air-fuel ratio control processing is started when the internal combustion engine 1 (specifically, the air-fuel ratio control apparatus 10) is started, and is continued until the internal combustion engine 1 (the air-fuel ratio control apparatus 10) stops.

When the air-fuel ratio control processing is started, in S110 (S represents "step"; this applies to the following description), the microprocessor performs initial setting processing, including initialization of operation of the RAM.

Notably, in the initial setting processing in S110, the microprocessor initializes the values of various parameters and the states of various flags used in the air-fuel ratio control processing.

In S120 subsequent thereto, the microprocessor determines whether or not the start state of the internal combustion engine is a low-temperature start state. When the microprocessor makes an affirmative determination, the microprocessor proceeds to S130. When the microprocessor makes a negative determination, the microprocessor proceeds to S200.

Specifically, in S120, the microprocessor determines whether or not the cooling water temperature Tc of the internal combustion engine is lower than a predetermined reference temperature T1. When the cooling water temperature Tc is lower than the reference temperature T1, the microprocessor determines that the engine is in a "low-temperature operation state" (affirmative determination). When the cooling water temperature Tc is equal to or higher than the reference temperature T1, the microprocessor determines that the engine is not in the "low-temperature operation state" (negative determination). Notably, the cooling water temperature Tc is detected based on the sensor output from the water temperature sensor 77 provided so as to detect the temperature of cooling water.

In the case where the microprocessor makes an affirmative determination in S120 and proceeds to S130, in S130, the microprocessor determines whether or not a downstream heater energization flag Fdh is in an ON state (Fdh=1). When the microprocessor makes an affirmative determination, the microprocessor proceeds to S160. When the microprocessor makes a negative determination, the microprocessor proceeds to S140.

The downstream heater energization flag Fdh is a flag which indicates the energization state of the downstream heater 16 provided in the downstream gas sensor 15. The downstream heater energization flag Fdh is set to an ON state (Fdh=1) when the heater is energized, and is set to an OFF state (Fdh=0) when the heater is not energized. Notably, in the initial setting processing of S110, the downstream heater energization flag Fdh is set to the OFF state (Fdh=0) (initial state).

In the case where the microprocessor makes a negative determination in S130 and proceeds to S140, in S140, the microprocessor starts the supply of electric current to the downstream heater 16 provided in the downstream gas sensor 15. As a result, the downstream heater 16 starts the heating of the downstream detection element 17 of the downstream gas sensor 15.

In the next step S150, the microprocessor performs the process of changing the state of the downstream heater energization flag Fdh to the ON state (Fdh=1).

In the case where the microprocessor makes an affirmative determination in S130 or ends the processing of S150, the microprocessor proceeds to S160. In S160, the microprocessor determines whether or not the downstream detection element 17 of the downstream gas sensor 15 becomes active. When the microprocessor makes an affirmative determination, the microprocessor proceeds to S170. When the microprocessor makes a negative determination, the microprocessor proceeds to S120.

Specifically, in S160, the microprocessor determines whether or not the element impedance of the downstream detection element 17 (hereinafter also referred to as the "downstream element impedance Rd") is lower than a predetermined downstream-side determination reference value Rtd. When the downstream element impedance Rd is lower than the downstream-side determination reference value Rtd, the microprocessor makes an affirmative determination. When the downstream element impedance Rd is equal to or higher than the downstream-side determination reference value Rtd, the microprocessor makes a negative determination.

Notably, the downstream detection element 17 of the present embodiment enters an activated state in which it can detect oxygen, when the temperature of the element becomes equal to or higher than 350° C. Since the downstream detection element 17 has characteristics such that the element impedance decreases as the element temperature increases, it is possible to determine the element temperature based on the downstream element impedance Rd and whether or not the downstream detection element 17 is in the activated state.

In the present embodiment, a value corresponding to the downstream element impedance Rd of the downstream detection element 17 at 350° C. is set as the downstream-side determination reference value Rtd.

In the case where the downstream detection element 17 has not yet been activated, the microprocessor makes a negative determination in S160, and repeatedly executes S120, S130 and S160 so as to wait until the downstream detection element 17 becomes active; i.e., enters the activated state (until an affirmative determination is made in S160).

In the case where the microprocessor makes an affirmative determination in S160 and proceeds to S170, in S170, the microprocessor controls the energization of the downstream heater 16 such that the element temperature of the downstream detection element 17 approaches a predetermined downstream target temperature Tdt.

In S170, the microprocessor determines the element temperature based on the downstream element impedance Rd of the downstream detection element 17, determines the quantity of heat to be transferred to the downstream detection element 17 based on the difference between the element temperature and the downstream target temperature Tdt, and controls the supply of electric current to the downstream heater 16 based on the determined heat quantity.

Notably, the downstream target temperature Tdt is a temperature at which the downstream detection element 17 of the downstream gas sensor 15 becomes active and at which the downstream detection element 17 of the downstream gas sensor 15 does not break due to water adhesion. In the present embodiment, the downstream target temperature Tdt is set to 400° C.

In the next step S180, the microprocessor changes the state of the downstream sensor feedback flag Fdf (hereinafter also referred to as the "downstream sensor FB flag Fdf") to an ON state (Fdf=1).

The downstream sensor FB flag Fdf is a flag which indicates whether or not the feedback control of the air-fuel ratio based on the sensor output from the downstream gas sensor 15 is being performed. In the case where such feedback control is being performed, the flag Fdf is set to an ON state (Fdf=1). In the case where such feedback control is not being performed, the flag Fdf is set to an OFF state (Fdf=0). Notably, in the initial setting processing of S110, the downstream sensor FB flag Fdf is set to the OFF state (Fdf=0) (initial state).

In S190 subsequent thereto, the microprocessor performs the feedback control of the air-fuel ratio based on the sensor output from the downstream gas sensor 15.

Specifically, the microprocessor determines the oxygen concentration of exhaust gas based on the sensor output from the downstream gas sensor 15, compares the oxygen concentration with a control reference value (a value corresponding to the oxygen concentration at the theoretical air-fuel ratio), computes a feedback coefficient based on the result of the comparison, and computes a fuel injection amount corresponding to the feedback coefficient. Namely, the feedback control of the air-fuel ratio based on the sensor output from the downstream gas sensor 15 is performed by controlling the fuel injection amount based on the sensor output from the downstream gas sensor 15.

Upon completion of the processing in S190, the microprocessor again proceeds to S120.

In the case where the microprocessor makes a negative determination in S120 and then proceeds to S200, in S200, the microprocessor determines whether or not an upstream heater energization flag Fuh is in an ON state (Fuh=1). When the microprocessor makes an affirmative determination, the microprocessor proceeds to S230. When the microprocessor makes a negative determination, the microprocessor proceeds to S210.

The upstream heater energization flag Fuh is a flag which indicates the energization state of the upstream heater 25 provided in the upstream gas sensor 22. The upstream heater energization flag Fuh is set to an ON state (Fuh=1) when the heater is energized, and is set to an OFF state (Fuh=0) when the heater is not energized. Notably, in the initial setting processing of S110, the upstream heater energization flag Fuh is set to the OFF state (Fuh=0) (initial state).

In the case where the microprocessor makes a negative determination in S200 and proceeds to S210, in S210, the microprocessor starts the supply of electric current to the upstream heater 25 provided in the upstream gas sensor 22. As a result, the upstream heater 25 starts the heating of the element section 24 of the upstream detection element 23 of the upstream gas sensor 22. Namely, the energization of the upstream heater 25 is started such that the element section 24 is heated to a temperature at which the element section 24 becomes active.

In the next step S220, the microprocessor performs the process of changing the state of the upstream heater energization flag Fuh to the ON state (Fuh=1).

In the case where the microprocessor makes an affirmative determination in S200 or ends the processing of S220, the microprocessor proceeds to S230. In S230, the microprocessor determines whether or not the upstream detection element 23 of the upstream gas sensor 22 is activated. When the microprocessor makes an affirmative determination, the microprocessor proceeds to S250. When the microprocessor makes a negative determination, the microprocessor proceeds to S240.

Specifically, in S230, the microprocessor determines whether or not the element impedance of the upstream detection element 23 (specifically, the oxygen concentration detection cell constituting the upstream detection element 23) (hereinafter also referred to as the "upstream element impedance Ru") is lower than a predetermined upstream-side determination reference value Rtu. When the upstream element impedance Ru is lower than the upstream-side determination reference value Rtu, the microprocessor makes an affirmative determination. When the upstream element impedance Ru is equal to or higher than the upstream-side determination reference value Rtu, the microprocessor makes a negative determination.

Notably, the upstream detection element 23 of the present embodiment enters an activated state in which it can detect oxygen, when the temperature of the element becomes equal to or higher than 700° C. Since the upstream detection element 23 has characteristics such that the element impedance decreases as the element temperature increases, it is possible to determine the element temperature based on the upstream element impedance Ru and whether or not the upstream detection element 23 is in the activated state.

In the present embodiment, a value corresponding to the upstream element impedance Ru of the upstream detection element 23 at 700° C. is set as the upstream-side determination reference value Rtu.

In the case where the upstream detection element 23 has not yet been activated, the microprocessor makes a negative determination in S230, and proceeds to S240. In S240, the microprocessor determines whether or not the downstream sensor FB flag Fdf is in the ON state (Fdf=1). When the microprocessor makes an affirmative determination, the microprocessor proceeds to S190. When the microprocessor makes a negative determination, the microprocessor proceeds to S250.

In other words, in S240, the microprocessor determines whether or not the feedback control of the air-fuel ratio based on the sensor output from the downstream gas sensor 15 is being performed. When feedback control is being performed, the microprocessor makes an affirmative determination and proceeds to S190. When feedback control is not being performed, the microprocessor makes a negative determination and proceeds to S250.

In the case where the microprocessor makes an affirmative determination in S240, the microprocessor proceeds to S190, whereby feedback control of the air-fuel ratio based on the sensor output from the downstream gas sensor 15 is continued.

In the case where the microprocessor makes an affirmative determination in S230 or makes a negative determination in S240, the microprocessor proceeds to S250. In S250, the microprocessor changes the state of the downstream sensor FB flag Fdf to an OFF state (Fdf=0).

In the next step S260, the microprocessor controls energization of the upstream heater 25 such that the element temperature of the upstream detection element 23 approaches a predetermined upstream target temperature Tut.

In S260, the microprocessor determines the element temperature based on the upstream element impedance Ru of the upstream detection element 23, determines the quantity of heat to be transferred to the upstream detection element 23 based on the difference between the element temperature and the upstream target temperature Tut, and controls the supply of electric current to the upstream heater 25 based on the determined heat quantity. Notably, in the present embodiment, the upstream target temperature Tut is set to 750° C.

In S270 subsequent thereto, the microprocessor performs feedback control of the air-fuel ratio based on the sensor output from the upstream gas sensor 22.

Specifically, the microprocessor determines the oxygen concentration of exhaust gas based on the sensor output from the upstream gas sensor 22, compares the oxygen concentration with a control reference value (a value corresponding to the oxygen concentration at the theoretical air-fuel ratio), computes a feedback coefficient based on the result of the comparison, and computes a fuel injection amount corresponding to the feedback coefficient. Namely, the feedback control of the air-fuel ratio based on the sensor output from the upstream gas sensor 22 is performed by controlling the fuel injection amount based on the sensor output from the upstream gas sensor 22.

Upon completing the processing in S270, the microprocessor again proceeds to S120.

As described above, as a result of execution of the air-fuel ratio control processing, in the case where the internal combustion engine is in the low-temperature start state and the downstream gas sensor 15 (the downstream detection element 17) has become active (an affirmative determination is made in each of S120 and S160), the feedback control of the air-fuel ratio based on the sensor output from the downstream gas sensor 15 is first performed (S190).

After the engine has exited the low-temperature start state and the upstream gas sensor 22 (the upstream detection element 23) has become active (a negative determination is made in S120 and an affirmative determination is made in S230), the feedback control of the air-fuel ratio based on the sensor output from the downstream gas sensor 15 is switched to feedback control of the air-fuel ratio based on the sensor output from the upstream gas sensor 22 (S270).

Next, catalyst deterioration determination processing will be described for determining the state of deterioration of the catalyst using the sensor output from the downstream gas sensor 15, which processing is part of the control processing executed in the control section 12 of the air-fuel ratio control apparatus 10.

Figure 6:
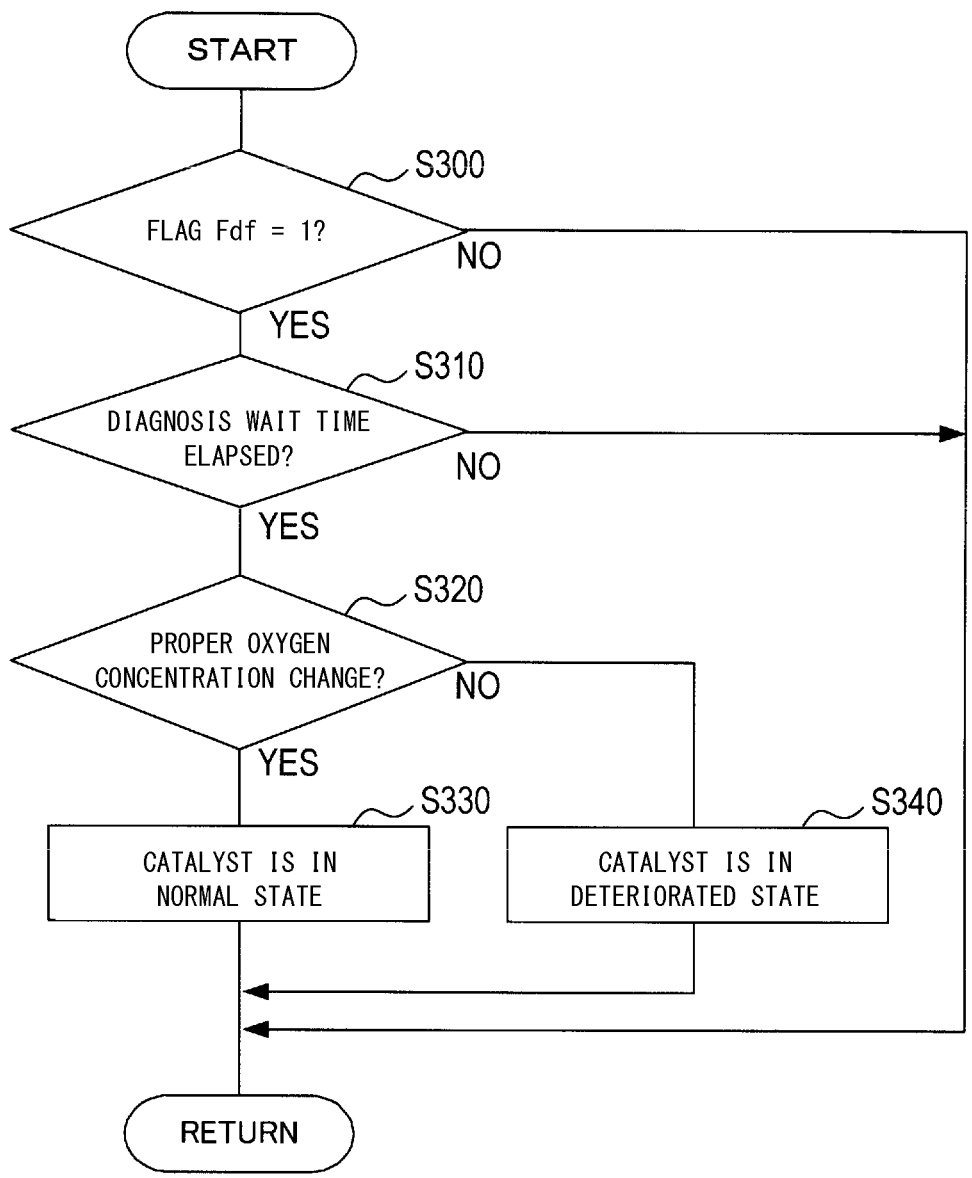
FIG. 6 is a flowchart showing the details of catalyst deterioration determination processing.

FIG. 6 is a flowchart showing the details of the catalyst deterioration determination processing.

Notably, the catalyst deterioration determination processing is started when the internal combustion engine 1 (specifically, the air-fuel ratio control apparatus 10) is started, and is repeatedly executed at fixed intervals until the internal combustion engine 1 (the air-fuel ratio control apparatus 10) stops.

When the catalyst deterioration determination processing is started, in S300 (S represents "step"), the microprocessor first determines whether the downstream sensor FB flag Fdf is in the ON state (Fdf=1). When the microprocessor makes an affirmative determination, the microprocessor proceeds to S310. When the microprocessor makes a negative determination, the microprocessor ends the present processing (catalyst deterioration determination processing).

In other words, in S300, the microprocessor determines whether or not the feedback control of the air-fuel ratio based on the sensor output from the downstream gas sensor 15 is being performed. In the case where the feedback control is being performed, the microprocessor makes an affirmative determination and proceeds to S310. In the case where the feedback control is not being performed, the microprocessor makes a negative determination and ends the present processing (catalyst deterioration determination processing).

In the case where the microprocessor makes an affirmative determination in S300, the microprocessor proceeds to S310. In S310, the microprocessor determines whether or not a predetermined diagnosis wait time has elapsed from the point at which an affirmative determination was made in S300. When the microprocessor makes an affirmative determination, the microprocessor proceeds to S320. When the microprocessor makes a negative determination, the microprocessor ends the present processing (catalyst deterioration determination processing).

In other words, in S310, the microprocessor determines whether or not the feedback control of the air-fuel ratio based on the sensor output from the downstream gas sensor 15 has been performed for a predetermined period of time or longer.

In the case where the microprocessor makes an affirmative determination in S310, the microprocessor proceeds to S320. In S320, the microprocessor determines whether or not the manner of change of the oxygen concentration detected by the downstream gas sensor 15 is proper. When the microprocessor makes an affirmative determination, the microprocessor proceeds to S330. When the microprocessor makes a negative determination, the microprocessor proceeds to S340.

Specifically, in S320, the microprocessor detects the change period of the waveform of the signal (output) from the downstream gas sensor 15, and compares the change period with a predetermined determination reference period Cj. In the case where the change period is longer than the determination reference period Cj, the microprocessor makes an affirmative determination and proceeds to S330. In the case where the change period is equal to or shorter than the determination reference period Cj, the microprocessor makes a negative determination and proceeds to S340.

When the microprocessor proceeds to S330 as a result of an affirmative determination in S320, in S330, the microprocessor determines that the catalyst 74 is in a normal state (in the undeteriorated state), and turns off the catalyst deterioration notification lamp 76.

When the microprocessor proceeds to S340 as a result of a negative determination in S320, in S340, the microprocessor determines that the catalyst 74 is in the deteriorated state, and turns on the catalyst deterioration notification lamp 76.

Upon completing the processing in S330 or S340, the microprocessor ends the catalyst deterioration determination processing.

Namely, in the catalyst deterioration determination processing, the microprocessor waits, by repeatedly executing the processing of S300 or S310, until feedback control of the air-fuel ratio based on the output of the downstream gas sensor 15 is performed for a predetermined period of time or longer. After feedback control of the air-fuel ratio based on the output of the downstream gas sensor 15 has been performed for the predetermined period of time or longer, in the catalyst deterioration determination processing, the microprocessor determines the state of deterioration of the catalyst 74 based on the result of the determination which is performed in S320 on the basis of the change period of the output of the downstream gas sensor 15.

[1-3. Determination of the State of Deterioration of the Catalyst]

Here, the results of a test will be described, performed so as to determine the influence of deterioration of the catalyst on the manner of change of oxygen concentration in an internal combustion engine in the low-temperature start state.

Specifically, the manner of change of the oxygen concentration of exhaust gas on the downstream of the catalyst was measured or determined when the internal combustion engine was in the low-temperature start state and feedback control of the air-fuel ratio based on the sensor output from the downstream gas sensor was performed. The manner of change of the oxygen concentration was determined for the case where the catalyst was a new, unused catalyst (in other words, a catalyst in a normal or undeteriorated state) and the case where the catalyst was an old catalyst having been used for a certain period of time (in other words, a catalyst in a deteriorated state).

Figure 7A:
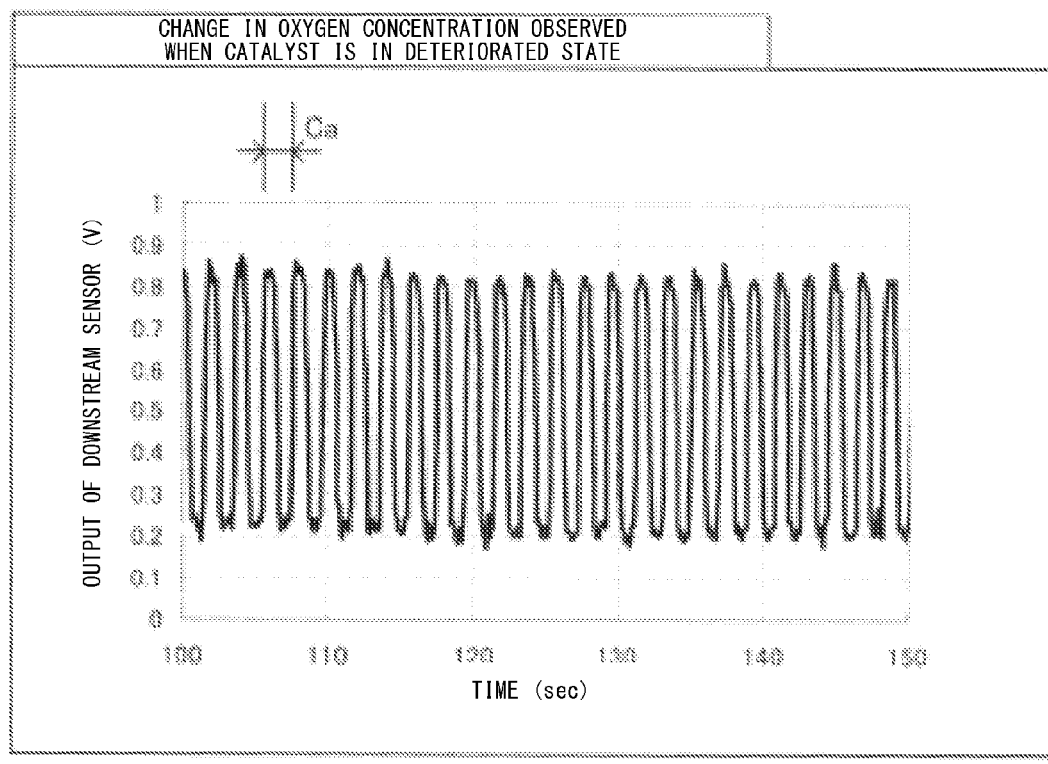
FIG. 7A is a chart showing the waveform of a sensor output from the downstream gas sensor observed when a catalyst is in a deteriorated state.
Figure 7B:
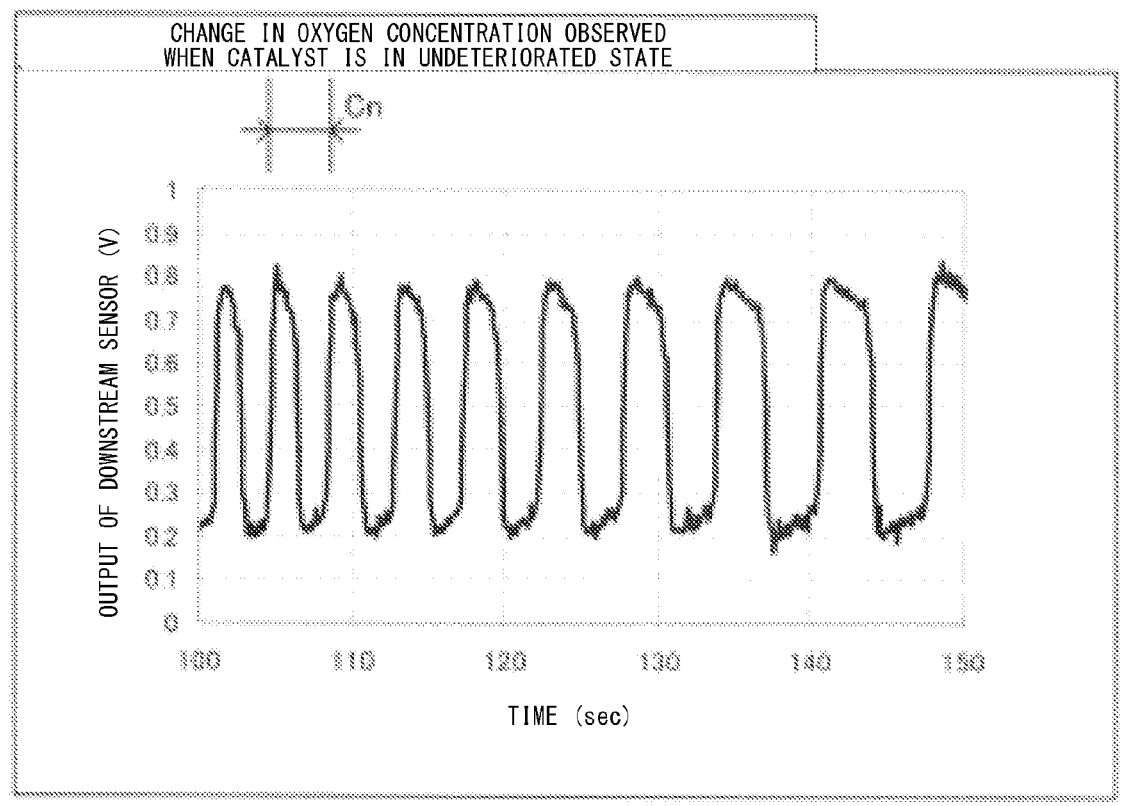
FIG. 7B is a chart showing the waveform of the sensor output from the downstream gas sensor observed when the catalyst is in a normal state (in an undeteriorated state).

FIG. 7A shows the manner of change of the oxygen concentration observed when the catalyst is in a deteriorated state, and FIG. 7B shows the manner of change of the oxygen concentration observed when the catalyst is in a normal state (an undeteriorated state). Specifically, the waveform illustrated in FIG. 7A is the waveform of the sensor output from the downstream gas sensor 15 observed when the catalyst is in a deteriorated state, and the waveform illustrated in FIG. 7B is the waveform of the sensor output from the downstream gas sensor 15 observed when the catalyst is in a normal state (in an undeteriorated state).

FIG. 7A shows the change period of the sensor output waveform of the downstream gas sensor 15 observed when the catalyst is in a deteriorated state (hereinafter this change period will be referred to as the "deteriorated-time period Ca"), and FIG. 7B shows the change period of the sensor output waveform of the downstream gas sensor 15 observed when the catalyst is in a normal state (an undeteriorated state) (hereinafter this change period will be referred to as the "normal-time period Cn"). When the deteriorated-time period Ca and the normal-time period Cn are compared, it is found that the deteriorated-time period Ca is shorter than the normal-time period Cn (Ca<Cn). Namely, in the case where the catalyst is in a normal state (an undeteriorated state), since the catalyst has a high oxygen absorption performance when activated, the normal-time period Cn becomes long. In the case where the catalyst is in a deteriorated state, since the catalyst has a low oxygen absorption performance when activated, the deteriorated-time period Ca becomes short.

It is found from the above-mentioned phenomenon that in the case where the air-fuel ratio is feedback-controlled based on the output of the downstream gas sensor 15, the response time (the time needed for the concentration of oxygen contained in exhaust gas to change as a result of the feedback control) changes with the degree of deterioration of the catalyst 74.

Therefore, as in the processing in S320 of the catalyst deterioration determination processing routine, the determination as to whether or not the catalyst 74 is in a deteriorated state can be made by comparing the detected change period of the oxygen concentration with the determination reference period Cj.

[1-4. Effects]

As described above, when the internal combustion engine 1 is determined to be in a low-temperature start state (an affirmative determination is made in S120), the air-fuel ratio control apparatus 10 of the present embodiment first controls the temperature of the downstream detection element 17 of the downstream gas sensor 15 to the downstream target temperature by making use of the downstream heater 16 of the downstream gas sensor 15 (S170), and feedback-controls the air-fuel ratio of the exhaust gas based on the output of the downstream gas sensor 15 (S190).

In the case where the internal combustion engine 1 is in a low-temperature start state, condensed water may exist in a region within the exhaust pipe 73 located upstream of the catalyst 74. However, such condensed water is dispersed (scattered) when it passes through the catalyst 74. Therefore, in the case where an affirmative determination is made in S120 (the engine is determined to be in a low-temperature start state), the possibility of breakage of the downstream detection element 17 of the downstream gas sensor 15 due to adhesion of the condensed water thereto is low even if the downstream heater 16 of the downstream gas sensor 15 is driven.

At that time, in S170, the heater is energized and controlled such that the temperature of the downstream detection element 17 of the downstream gas sensor 15 approaches the downstream target temperature Tdt (400° C.). The downstream target temperature Tdt (400° C.) is a temperature at which the downstream detection element 17 of the downstream gas sensor 15 does not break due to water adhesion. Therefore, even when condensed water adheres to the downstream detection element 17 of the downstream gas sensor 15, the downstream detection element 17 does not break due to water adhesion.

Since the downstream gas sensor 15 is activated as a result of the temperature of the downstream detection element 17 of the downstream gas sensor 15 being controlled to the downstream target temperature Tdt (400° C.) in S170, in S190, the exhaust air-fuel ratio can be feedback-controlled based on the output of the downstream gas sensor 15.

Namely, in the case where the internal combustion engine 1 is in a low-temperature start state, the air-fuel ratio control apparatus 10 can drive the downstream heater 16 of the downstream gas sensor 15 and feedback-control the exhaust air-fuel ratio based on the output of the downstream gas sensor 15 without waiting until the temperature of the exhaust system reaches the moisture evaporation temperature.

Also, in the case where the internal combustion engine 1 is not in a low-temperature start state, the air-fuel ratio control apparatus 10 can drive the upstream heater 25 of the upstream gas sensor 22 and feedback-control the exhaust air-fuel ratio based on the output of the upstream gas sensor 22.

Namely, in the case where the internal combustion engine 1 is in a low-temperature start state, the air-fuel ratio control apparatus 10 performs feedback control of the air-fuel ratio at an early timing by using the downstream gas sensor 15; and in the case where the internal combustion engine 1 is not in a low-temperature start state, the air-fuel ratio control apparatus 10 performs feedback control of the air-fuel ratio at an early timing by using the upstream gas sensor 22.

Accordingly, even in the case where the internal combustion engine 1 is in a low-temperature start state, the air-fuel ratio control apparatus 10 of the present embodiment can perform feedback control of the air-fuel ratio at an early timing without waiting until the temperature of the exhaust system reaches the moisture evaporation temperature.

Also, in S320 of the catalyst deterioration determination processing routine, the air-fuel ratio control apparatus 10 of the present embodiment detects the change period of the waveform of the signal (output) from the downstream gas sensor 15, and compares the change period and the determination reference period Cj. In the case where the change period is longer than the determination reference period Cj, the control apparatus 10 determines that the catalyst 74 is in a normal state, and turns off the catalyst deterioration notification lamp 76. In the case where the change period is equal to or shorter than the determination reference period Cj, the control apparatus 10 determines that the catalyst 74 is in a deteriorated state, and turns on the catalyst deterioration notification lamp 76.

Namely, when the catalyst 74 becomes deteriorated, the air-fuel ratio control apparatus 10 notifies a user of the necessity of replacing the catalyst 74 by turning on the catalyst deterioration notification lamp 76. By replacing the catalyst 74 at a proper timing in accordance with notification by the catalyst deterioration notification lamp 76, it becomes possible to properly perform the feedback control of the air-fuel ratio while suppressing the influence of the deteriorated catalyst.

Therefore, according to the air-fuel ratio control apparatus 10 of the present embodiment, even when the internal combustion engine 1 is in a low-temperature start state, feedback control of the air-fuel ratio can be performed early and the state of deterioration of the catalyst 74 can be determined. Therefore, it becomes possible to properly control the air-fuel ratio in consideration of the state of deterioration of the catalyst 74.

[1-5. Corresponding Structure]

The relation between the invention and corresponding structure in the present embodiment is as follows.

The exhaust pipe 73 of the embodiment corresponds to the exhaust passage of the invention; the upstream heater 25 corresponds to the element heating heater of the upstream gas sensor; the element section 24 corresponds to the detection element of the upstream gas sensor; the downstream heater 16 corresponds to the element heating heater of the downstream gas sensor; and the downstream detection element 17 corresponds to the detection element of the downstream gas sensor.

The control section 12 which executes S140, S170, S210 and S260 corresponds to the heater control means; the control section 12 which executes S190 and S270 corresponds to the air-fuel ratio control means; the control section 12 which executes S120 corresponds to the start state determination means; and the control section 12 which executes S320, S330 and S340 corresponds to the catalyst deterioration determination means.

[2. Other Embodiments]

Although one embodiment of the present invention has been described above, the present invention is not limited thereto, and may be implemented in various forms without departing from the scope of the invention.

For example, in the above-described embodiment, the downstream gas sensor 15 having the downstream detection element 17 formed into a bottomed tubular shape is used as the downstream gas sensor. However, a gas sensor having a detection element formed into a plate-like shape may be used as the downstream gas sensor.

The determination thresholds (temperature condition, time condition, etc.) of various parameters used in the air-fuel ratio control processing and the catalyst deterioration determination processing are not limited to the above-described values, and arbitrary values may be used within a range in which proper determination processing is possible.

In the above-described embodiment, the control section 12, which serves as the start state determination means, determines, in S120 of the air-fuel ratio control processing of FIG. 5, whether or not the start state of the internal combustion engine is in a low-temperature start state, based on the output of the water temperature sensor 77. However, the method of determining whether or not the start state of the internal combustion engine is in a low-temperature start state is not limited thereto. For example, the control section 12 may determine whether or not the start state of the internal combustion engine is in a low-temperature start state by using an exhaust temperature sensor which detects the temperature of exhaust gas or an ambient temperature sensor which detects the temperature of external air. Namely, the start state determination means of the present invention may be configured freely so long as it can determine whether or not the internal combustion engine is in a low-temperature start state in which condensed water is presumed to exist in a region of the exhaust passage located on the upstream side of the catalyst.

In the above-described embodiment, when the engine is determined not to be in a low-temperature start state (a negative determination is made in S120), the energization of the upstream heater 25 of the upstream gas sensor 22 is started. However, the method of energizing the upstream heater 25 is not limited to the above-described method. For example, the upstream heater 25 may be energized as follows. When the engine is determined to be in a low-temperature start state (an affirmative determination is made in S120), the upstream heater 25 is pre-heated so as to heat the upstream detection element 23 to a temperature at which the upstream detection element 23 does not become active and the upstream detection element 23 does not break due to water adhesion. Further, when the engine is determined not to be in a low-temperature start state (a negative determination is made in S120), the regular energization of the upstream heater 25 is performed such that the upstream detection element 23 (the element section 24) reaches a temperature at which it becomes active. Also, even when the engine is determined not to be in a low-temperature start state, the energization of the downstream heater 16 of the downstream gas sensor 15 may be continued so as to enable various types of processing, such as correction of the output of the upstream gas sensor 22, to be performed by making use of the output of the downstream gas sensor 15.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2013-002043 filed Jan. 9, 2013, the above-noted application incorporated herein by reference in its entirety.

What is claimed is:

1. An air-fuel ratio control apparatus comprising:
   a catalyst provided in an exhaust passage of an internal combustion engine;
   an upstream gas sensor which is provided in the exhaust passage to be located on the upstream side of the catalyst and which includes a detection element and an element heating heater;
   a downstream gas sensor which is provided in the exhaust passage to be located on the downstream side of the catalyst and which includes a detection element and an element heating heater;
   heater control means for controlling the heating states of the element heating heater of the upstream gas sensor and the element heating heater of the downstream gas sensor; and
   air-fuel ratio control means for controlling exhaust air-fuel ratio on the basis of an output from at least one of the upstream gas sensor and the downstream gas sensor,
   the air-fuel ratio control apparatus further comprising:
   start state determination means for determining whether or not the internal combustion engine is in a low-temperature start state, wherein
   the heater control means controls the temperature of the detection element of the downstream gas sensor to a predetermined downstream target temperature using the element heating heater of the downstream gas sensor when the start state determination means determines that the engine is in the low-temperature start state, and the heater control means controls the temperature of the detection element of the upstream gas sensor to a predetermined upstream target temperature using the element heating heater of the upstream gas sensor when the start state determination means determines that the engine is not in the low-temperature start state;
   the air-fuel ratio control means feedback-controls the exhaust air-fuel ratio based on the output of the downstream gas sensor when the start state determination means determines that the engine is in the low-temperature start state and the detection element of the downstream gas sensor becomes active, and the air-fuel ratio control means feedback-controls the exhaust air-fuel ratio based on the output of the upstream gas sensor when the start state determination means determines that the engine is not in the low-temperature start state and the detection element of the upstream gas sensor becomes active; and
   the downstream target temperature is a temperature which is lower than the upstream target temperature and at which the detection element of the downstream gas sensor becomes active, and at which the detection element of the downstream gas sensor does not break due to water adhesion.

2. The air-fuel ratio control apparatus as claimed in claim 1, further comprising catalyst deterioration determination means for determining whether or not a change period of the output of the downstream gas sensor satisfies a predetermined catalyst deterioration condition when the exhaust air-fuel ratio is controlled by the air-fuel ratio control means based on the output of the downstream gas sensor, the catalyst deterioration determination means determining that the catalyst is in a deteriorated state when the change period satisfies the catalyst deterioration condition, and determining that the catalyst is in an undeteriorated state when the change period does not satisfy the catalyst deterioration condition.

3. The air-fuel ratio control apparatus as claimed in claim 1, wherein
   the detection element of the upstream gas sensor is a plate-shaped oxygen detection element whose output changes linearly in accordance with the oxygen concentration of exhaust gas; and the detection element of the downstream gas sensor is an oxygen detection element which has a bottomed tubular shape and whose output changes abruptly near the theoretical air-fuel ratio.

* * * * *